(12) United States Patent
Allan et al.

(10) Patent No.: US 8,879,394 B2
(45) Date of Patent: Nov. 4, 2014

(54) METHOD AND SYSTEM OF PACKET BASED IDENTIFIER LOCATOR NETWORK PROTOCOL (ILNP) LOAD BALANCING AND ROUTING

(71) Applicant: Telefonaktiebolaget L M Ericsson, Stockholm (SE)

(72) Inventors: David Ian Allan, San Jose, CA (US); Joel Halpern, Leesburg, VA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 176 days.

(21) Appl. No.: 13/657,727

(22) Filed: Oct. 22, 2012

(65) Prior Publication Data
US 2014/0112139 A1   Apr. 24, 2014

(51) Int. Cl.
*H04L 12/28* (2006.01)
*H04L 12/56* (2006.01)
*H04L 12/26* (2006.01)
*H04L 1/00* (2006.01)
*H04L 12/16* (2006.01)

(52) U.S. Cl.
USPC ........... 370/235; 370/229; 370/230; 370/253; 370/389

(58) Field of Classification Search
USPC ........................................................ 370/235
See application file for complete search history.

(56) References Cited

U.S. PATENT DOCUMENTS

| | | | |
|---|---|---|---|
| 2001/0021175 A1* | 9/2001 | Haverinen | 370/230 |
| 2004/0066745 A1* | 4/2004 | Joe | 370/235 |
| 2004/0264374 A1* | 12/2004 | Yu et al. | 370/230 |
| 2005/0007954 A1* | 1/2005 | Sreemanthula et al. | 370/229 |
| 2005/0063307 A1* | 3/2005 | Samuels et al. | 370/235 |
| 2006/0120288 A1* | 6/2006 | Vasseur et al. | 370/235 |
| 2006/0155801 A1* | 7/2006 | Brabson | 709/201 |
| 2009/0003214 A1* | 1/2009 | Vaswani et al. | 370/236 |
| 2010/0208742 A1* | 8/2010 | Kafle et al. | 370/401 |
| 2012/0180122 A1* | 7/2012 | Yan et al. | 726/15 |

OTHER PUBLICATIONS

Atkinson RJ et al. "Optional Advanced Deployment Scenarios for ILNP draft-irtf-rrg-ilnp-adv-00.txt", Internet draft, Jan. 12, 2012, whole document.
Atkinson RJ et al. "ILNP Architectural Description draft-irtf-rrg-ilnp-arch-06.txt", Internet draft, Jul. 10, 2012, whole document.
Atkinson RJ et al. "ICMP Locator Update message for ILNPv6 draft-irtf-rrg-ilnp-icmpv6-06.txt", Internet draft, Jul. 10, 2012, whole document.
Atkinson RJ et al. "IPv6 Nonce Destination Option for ILNPv6 draft-irtf-rrg-ilnp-noncev6-06.txt", Internet draft, Jul. 10, 2012, whole document.

\* cited by examiner

*Primary Examiner* — Jenee Williams

(57) ABSTRACT

A method to provide load balancing and routing for a plurality of end systems in a network. The network contains a load balancer (LB) and the method comprises receiving a request packet with Internet Protocol version 6 (IPv6) addresses specified. A destination address is associated with a set of target end systems and presence of a nonce information indicates the requesting correspondent node is Identifier Locator Network Protocol (ILNP) capable. The method further comprises directing the request packet to a specific end system from the set of target end systems that share a load balanced address, wherein each target end system has a unique direct path locator prefix. The method also comprises overwriting a common IPv6 locator prefix with the unique direct path locator prefix, forwarding the request packet to the specific end system, and notifying a requesting correspondent node the direct path locator prefix for the specific end system.

22 Claims, 14 Drawing Sheets

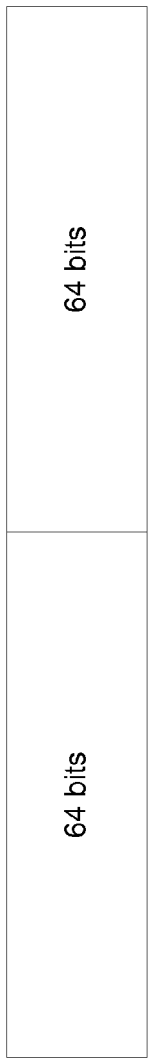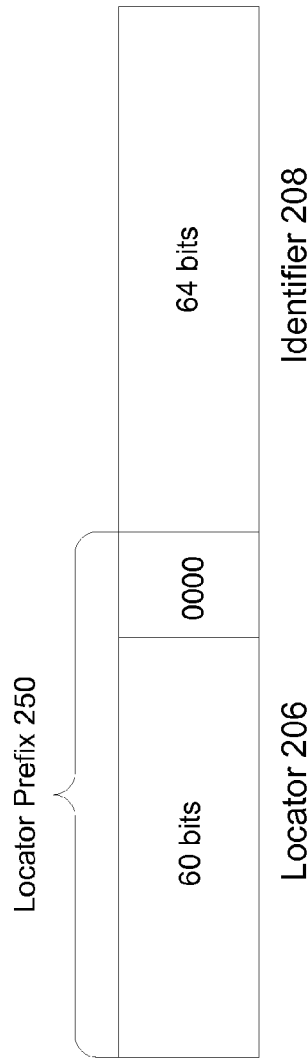
FIG. 2A
FIG. 2B

METHOD AND SYSTEM OF PACKET BASED IDENTIFIER LOCATOR NETWORK PROTOCOL (ILNP) LOAD BALANCING AND ROUTING

CROSS-REFERENCE TO RELATED APPLICATION

This application is related to co-pending U.S. patent application Ser. No. 13/657,740, entitled "Method and System of Frame Based Identifier Locator Network Protocol (ILNP) Load Balancing and Routing," filed Oct. 22, 2012, which is incorporated by reference herein in its entirety.

FIELD

The embodiments of the invention are related to the field of load balancing and routing in a data network. More specifically, the embodiments of the invention relate to a method and system for load balancing and routing data traffic using Identifier Locator Network Protocol (ILNP).

BACKGROUND

Routing has always been a critical aspect of data networking. Routing challenges evolves as data networks go through technological advances over the past several decades. One recent advance is the remarkable acceleration of the adoption of Internet Protocol version 6 (IPv6). The Internet Society declared Jun. 6, 2012 to be the date for "World IPv6 Launch," with participating major websites enabling IPv6 permanently. Wider deployment of IPv6 in data networks offers a new way for service providers to provide routing efficiency.

Also in the recent years, cloud computing through data networks has transformed the way applications are created and run. Cloud computing employs the Infrastructure as a Service (IaaS) model in which customers outsource their computing and software capabilities to third party infrastructures and pay for the service usage on demand. Compared to the traditional computing model that uses dedicated, in-house infrastructures, cloud computing provides many advantages, including economies of scale, dynamic provisioning, and low capital expenditures.

The growth of cloud computing and IPv6 presents challenges to data networks. In a cloud computing environment, it is desirable to balance work load from customers across multiple servers, virtual machines (VMs), and other computing devices that spread multiple geographic and logic locations. Load balancing can make use of end computing resources more efficiently by avoiding overload and optimizing resource utilization. In addition, work load from customers uses significant bandwidth on data networks, and it is desirable to route traffic generated from cloud computing efficiently so that bandwidth, a precious resource on a data network, can be utilized properly so that throughput increases and response time is reduced. IPv6 offers new ways to address routing efficiency. Furthermore, mobile computing is now prevalent with ever enhancing computing power packaged in ever shrinking computing form factors. It is desirable for data networks to keep track of mobile computing devices so they can be utilized in load balancing and efficient routing.

SUMMARY

A method to provide load balancing and routing for a plurality of end systems in a network. The network contains at least one load balancer (LB) that balances traffic load across the plurality of end systems. The method comprises receiving at the LB a request packet with Internet Protocol version 6 (IPv6) source and destination addresses specified, and wherein a source address is associated with a requesting correspondent node (CN) and a destination address is associated with a set of target end systems, and nonce information in the packet indicates that the CN is Identifier Locator Network Protocol (ILNP) capable. The method further comprises directing the request packet to a specific end system from the set of target end systems, wherein the set of target end systems is identifiable by the requesting CN by a load balanced address, wherein each target end system has a unique direct path locator prefix and a common ILNP identifier, and wherein the load balanced address is a single IPv6 address containing a common IPv6 locator prefix and the common ILNP identifier shared among the set of target end systems. The method also comprises overwriting the common IPv6 locator prefix of the destination address with the unique direct path locator prefix of the specific end system, forwarding the request packet to the specific end system, and using an ICMP locator change update to notify the CN of the unique direct path locator prefix of the specific end system upon discovering an end system nonce for communication between the CN and the specific end system.

A network element serving as a load balancer (LB) to provide load balancing and routing for a plurality of end systems in a network. The network element comprises a communication module configured to receive a request packet with Internet Protocol version 6 (IPv6) source and destination addresses specified, and wherein a source address is associated with a requesting correspondent node (CN) and a destination address is associated with a set of target end systems, and wherein nonce information in the request packet indicates that the CN is Identifier Locator Network Protocol (ILNP) capable, wherein the communication module further configured use an ICMP locator change message to notify the CN of the unique direct path locator prefix of the specific end system upon discovering an end system nonce for communication between the CN and the specific end system. The network element further comprises a network processor including a load assignment module. The load assignment module comprises a target address translator configured to direct the request packet and any subsequent packets associated with that specific flow to a specific end system from the set of target end systems, wherein the set of target end systems is identifiable by the requesting CN by a load balanced address, wherein each target end system has a unique direct path locator prefix and a common ILNP identifier, and wherein the load balanced address is a single IPv6 address containing a common IPv6 locator prefix and the common ILNP identifier shared among the set of target end systems, an address updater configured to overwrite the common IPv6 locator prefix of the destination address with the unique direct path locator prefix of the specific end system, and a data forwarder configured to forward the request packet to the specific end system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted

FIGS. 2A-2B are block diagrams illustrating ILNP addresses.

DETAILED DESCRIPTION

Figure 1:
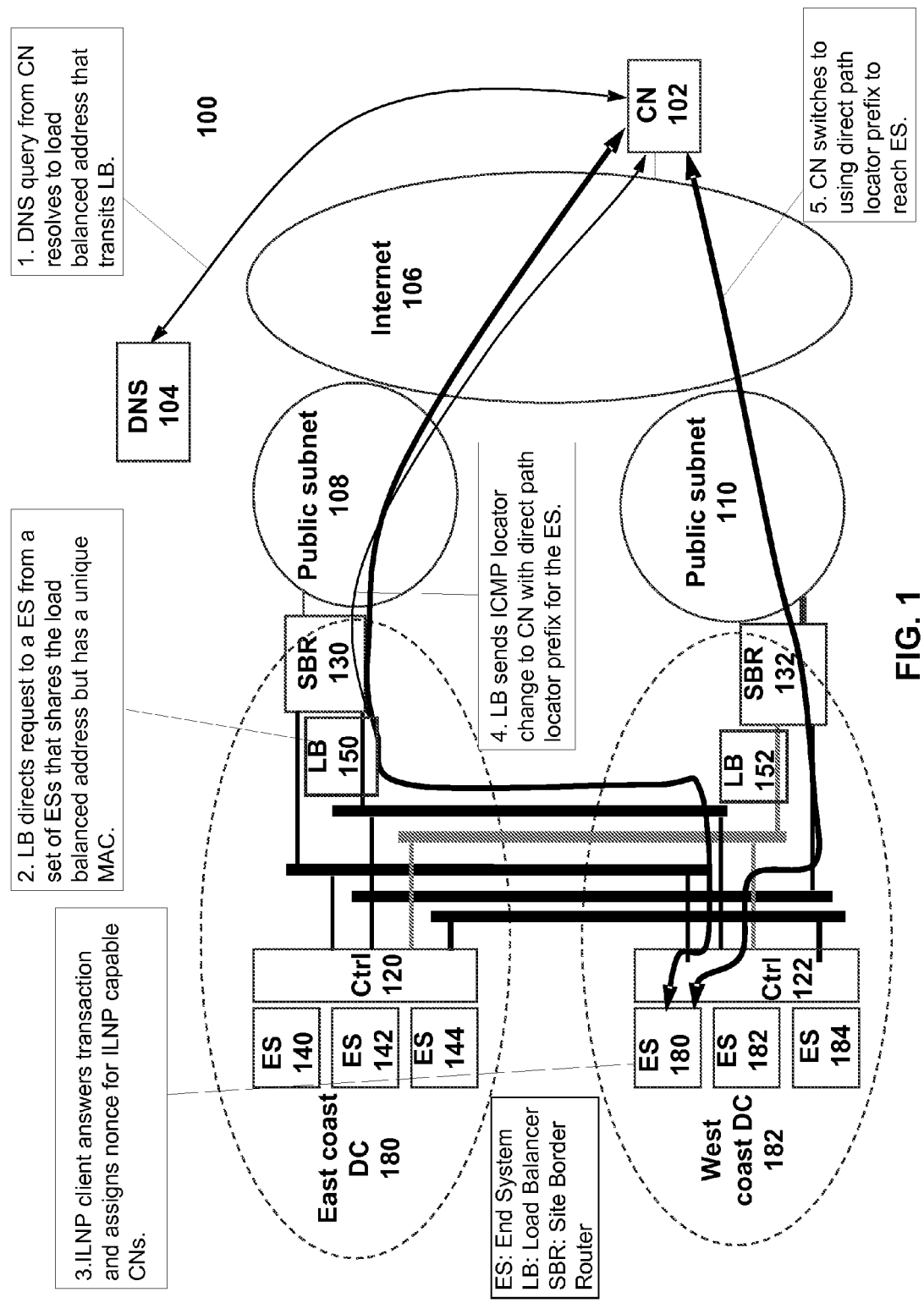
FIG. 1 is a block diagram illustrating one embodiment of a network configuration and operation of frame based Identifier Locator Network Protocol (ILNP) routing.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIG. 14. However, it should be understood that the operations of flow diagrams can be performed by embodiments of the invention other than those discussed with reference to FIGS. 7, 10, and 13, and the embodiments discussed with reference to FIG. 14 can perform operations different than those discussed with reference to the flow diagrams of FIGS. 7, 11, and 14.

As used herein, a network element (e.g., a router, switch, bridge, load balancer) is a piece of networking equipment, including hardware and software that communicatively interconnects other equipment on the network (e.g., other network elements, end systems). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network elements, which are coupled (e.g., through one or more core network elements) to other edge network elements, which are coupled to other end systems (e.g., server end systems). In this specification, the term "end station" and "end system" are used interchangeably.

Network elements are commonly separated into a control plane and a data plane (sometimes referred to as a forwarding plane or a media plane). In the case that the network element is a router (or is implementing routing functionality, such as a load balancer), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Note that embodiments of this invention apply where the control plane and data plane are in separate network elements.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

TERMS

The following terms are used in the description.

Target end systems—A set of end systems associated with a load balanced address that is to have traffic load balanced across them. The set of end systems share a common Identifier Locator Network Protocol (ILNP) identifier.

Load balanced address—A single IPv6 address that is advertised for access to an application served by a set of target end systems into a Domain Name System (DNS) of a network. The IPv6 address comprises a public locator prefix and a common ILNP identifier shared among a set of target end systems. In some embodiments, a load balanced address is advertised in a DNS, and a DNS name is used in a URL identifying an application served by a set of target end systems.

Direct path address—A concatenation of IPv6 ILNP locator and identifier that is a publically routable path to a particular end system.

Direct path locator prefix—An IPv6 locator advertised into the outside world where connectivity between the outside world and an end system bypasses load balancing.

Network Configuration

FIG. 1 is a block diagram illustrating one embodiment of a network configuration and operation of frame based Identifier Locator Network Protocol (ILNP) routing. The diagram depicts network 100, where Internet 106 represents the Internet in general and routing in the data network goes through the Internet. A node, named correspondent node (CN) 102, is an end system requesting routing through Internet 106. The term correspondent node is generally associated with mobile network. Correspondent node 102 is so named to indicate that routing and load balancing discussed here can be used when a requesting node is a mobile node, but the same method can be used even if a requesting node is stationary. CN 102 requests routing to a set of target end systems and the set of target end systems include ones in public subnet 108 and public subnet 110. The end systems in public subnet 108 are represented by end systems (ES) 140-144, and the end systems in public subnet 110 are represented by end systems (ES) 180-184. In one example embodiment, ES 140-144 are in East Coast data center (DC) 180 and they are managed by controller 120. Also in East coast DC 180 there are load balancer (LB) 150 and site border router (SBR) 130. SBR 130 performs some basic checks on network activity, such as ingress and egress filtering. LB 150 performs load balancing to distribute workload across multiple computing devices (e.g., end systems in this embodiment). LB 150 may use various metrics to balance workload. For example, it may balance workload and select a particular end system in order to achieve goals such as optimal computing resource utilization, maximizing throughput, minimizing response time, and/or avoiding overload. In west coast DC 182, there are controller 122, LB 152 and SBR 132 serving similar functions as controller 120, LB 150 and SBR 130 in east coast DC 180.

DC 180 and DC 182 are presented to illustrate that data centers at different geographic locations may use the proposed inventions. However, the other embodiments are not so limited. For example, in one embodiment, data centers are at different logic locations. In another example, data centers may be logically separated by different subnets. In addition, in some embodiments, end systems may be within a single data center and subnet, while in some other embodiments, end systems are distributed to more than two data centers and subnets. Also note that even through one LB is illustrated for each data center, one LB may manage load balancing across multiple data centers. When multiple LBs manage multiple data centers, the LBs need to coordinate with each other so workloads are managed efficiently.

Domain name system (DNS) 104 is a distributed naming system for network 100. DNS 104 resolves queries for a host to a destination address. For example, when DNS 104 receives a request for a domain name from a requesting node, DNS 104 will return the requesting node an IP address so that the requesting node may communicate with the computing device with the IP address being set as the destination address. In general, DNS allows computing devices to change location without broadcasting the change to all possible requesting nodes. The computing devices only need to update a DNS so the future request will be pointed to a new location (thus a new IP address) by the DNS.

In one embodiment, DCs 180 and 182 are within a virtual network and the end systems 140-144 and 180-184 are virtual machines (VMs) in virtual network 100. CN 102 requests routing to these VMs when CN 102 runs an application and requires distributed computing resources. In that case, controllers 120 and 122 are virtual machine switches (vSwitches) or hypervisors. Hypervisors coordinates routing and load balancing for VMs the hypervisors host. In a virtual network, an orchestration layer of the virtual network maintains DNS 104.

Addressing for Load Balancing and Routing

In the example of FIG. 1, routing or load balancing starts with CN 102 sending a request to DNS 104 to resolve a domain name to an address. DNS 104 in turn returns a load balanced address back to CN 102. The load balanced address is an IPv6 address. FIG. 2A is a block diagram illustrating an IPv6 address using identifier locator network protocol (ILNP). An IPv6 address contains 128 bits (16 bytes) and it can be used as a single entity to address a network element. The same IPv6 address may be further divided so that routing based on the IPv6 can be more efficient. One alternative addressing architecture is 8+8/GSE (global, site and end-system) initially proposed by Mike O. Dell around 1995. The "8+8/GSE" architecture has been reconsidered over the years and resulted in a protocol suite, named identifier locator network protocol (ILNP) which addresses a number of the shortcomings of the original 8+8 proposal. An ILNP address splits a 16 byte IPv6 address into two parts, 8 bytes becomes a locator that may indicate the location of a network element, and the other 8 bytes become an identifier that may identify an associated session, application, connection, or others. In FIG. 2A, locator 202 illustrates a 64 bit locator. The value of a locator field may changes as a network element associated with the locator changes its physical or logical location within a network, thus the value of a locator field is topologically significant. Identifier 204 illustrates a 64 bits identifier. The value of an identifier does not change with network element locations (not topologically significant), and it may be associated with upper layer (OSI Layers 4-7) protocols to identify an end system independent of location.

FIG. 2B is a block diagram illustrating an ILNP address with a locator prefix as can be used for the purpose described in this disclosure. In the 64 bits locator 206, 60 bits are prefix bits, which leaves 4 bits that can be used for identification purpose. In other words, even though a network element has only 64 bits identifier, it is possible to modify the usage such that the 64+4=68 bits can be used for identification. Stating it differently, $2^4=16$ network elements can share a single common identifier and a single common locator prefix, yet still have unique IPv6 addresses, distinguished by the 4 bits untouched by the common locator prefix. The observation of a locator prefix and an identifier combination being shared by multiple network elements can be applied on routing and load balancing.

Figure 3:
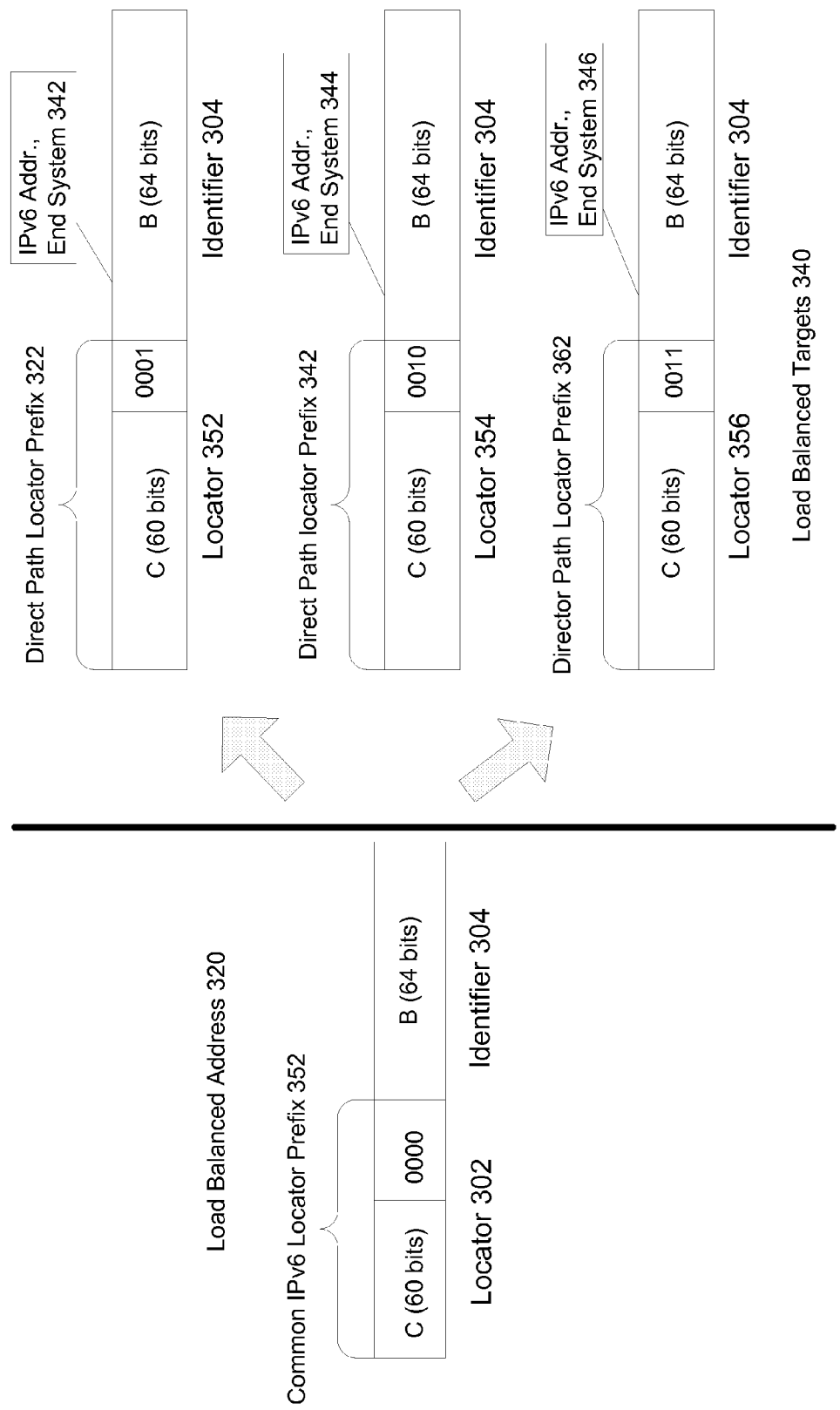
FIG. 3 is a block diagram illustrating one embodiment of assigning a load balanced address to multiple end systems.

FIG. 3 is a block diagram illustrating one embodiment of assigning a load balanced address to multiple end systems. In FIG. 3, load balanced address 320 has a 64 bits locator, locator 302 and a 64 bits identifier, identifier 304. The load balanced address can be assigned to a number of end systems. End systems 342, 344, and 346 all have the same 64 bits identifier, identifier 304, but they have different locators. Through direct path locator prefixes 322-362, these end systems can be identified individually by other end systems or correspondent nodes. The direct path locator prefixes take the full 64 bits of the locator field. However, these direct path locator prefixes can be supernetted, e.g., each end system has a unique direct path locator prefix in a supernet, a 60 bits supernet with value of C as shown in FIG. 3. That is, the 64 bits locators of the three end systems share a common prefix, which is common IPv6 locator prefix 352. The three end systems 342-346 are distinguishable through their 64 bit direct path locator prefixes. At the same time, the three end systems can be grouped as a set of load balanced targets, load balanced targets 340. In other words, these end systems share a common IPv6 locator prefix 352 and a common identifier 304, but each is reachable via a unique IPv6 address.

Figure 4:
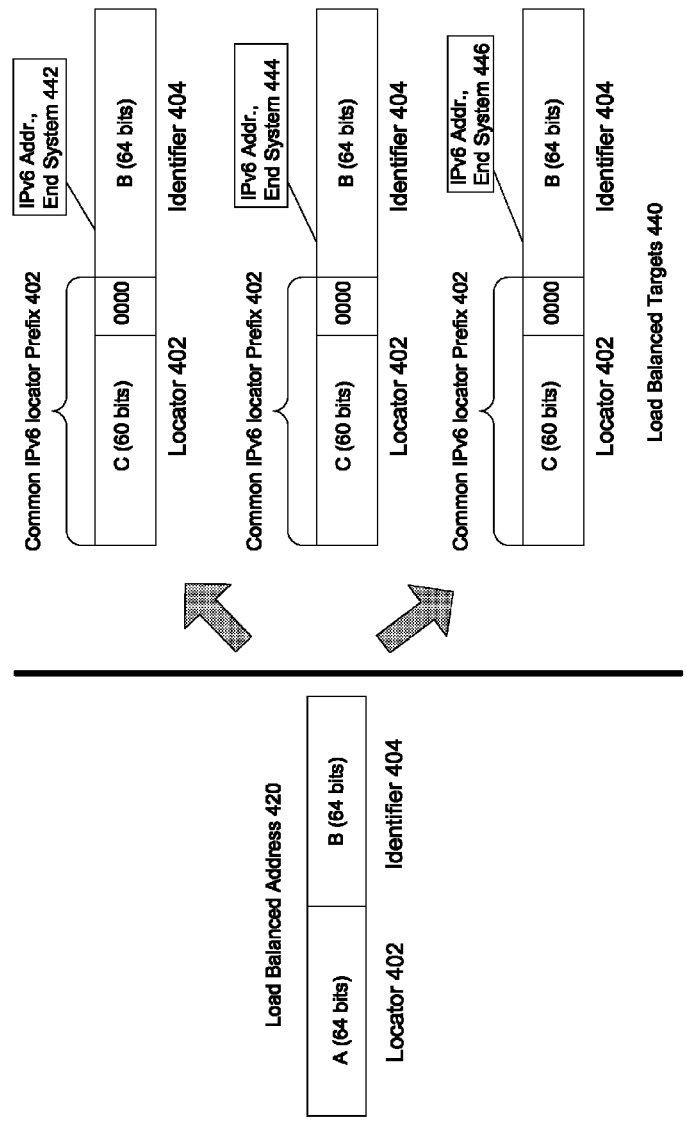
FIG. 4 is a block diagram illustrating another embodiment of assigning a load balanced address to multiple end systems.

FIG. 4 is a block diagram illustrating another embodiment of assigning a load balanced address to multiple end systems. In FIG. 4, a load balanced address 420 has a 64 bits locator 402 and 64 bits identifier 404. The load balanced address 420 can be assigned to multiple end systems. Here the address is assigned to end systems 442, 444, and 446. Each end system share the same common IPv6 locator prefix 402. They form a set of load balanced targets 440. The end systems of the load balanced targets 440 are not distinguishable through IPv6 addresses, but each end system has a unique media access control address (MAC) address. A MAC address is a unique identifier at the Open System Interconnection (OSI) layer 2. A MAC address of a network element is often assigned by the manufacturer of the network element, and the MAC address is assigned on a network interface for communication on a physical network segment. A standard MAC address contains 6 bytes, and assigning unique MAC address to a network interface on a network element is known to the people skilled in the art. In this embodiment, because a MAC address is utilized to identify an end system, an Ethernet frame, is analyzed for routing and load balancing. An Ethernet frame, or a frame, begins with a preamble and a start frame delimiter, followed by destination and source MAC addresses, a payload, and ended with a cyclic redundancy check. We will discuss in detail on the ways to perform load balancing and routing utilizing frame and load balanced target end systems.

Note that in this specification, the terms "load balanced target," "load balanced target end system," and "target end systems" are used interchangeably. Note even though the multiple end systems share a common load balanced address and uniquely distinguishable by MAC address, each end system will have one or more unique direct path locator prefix.

Figure 5:
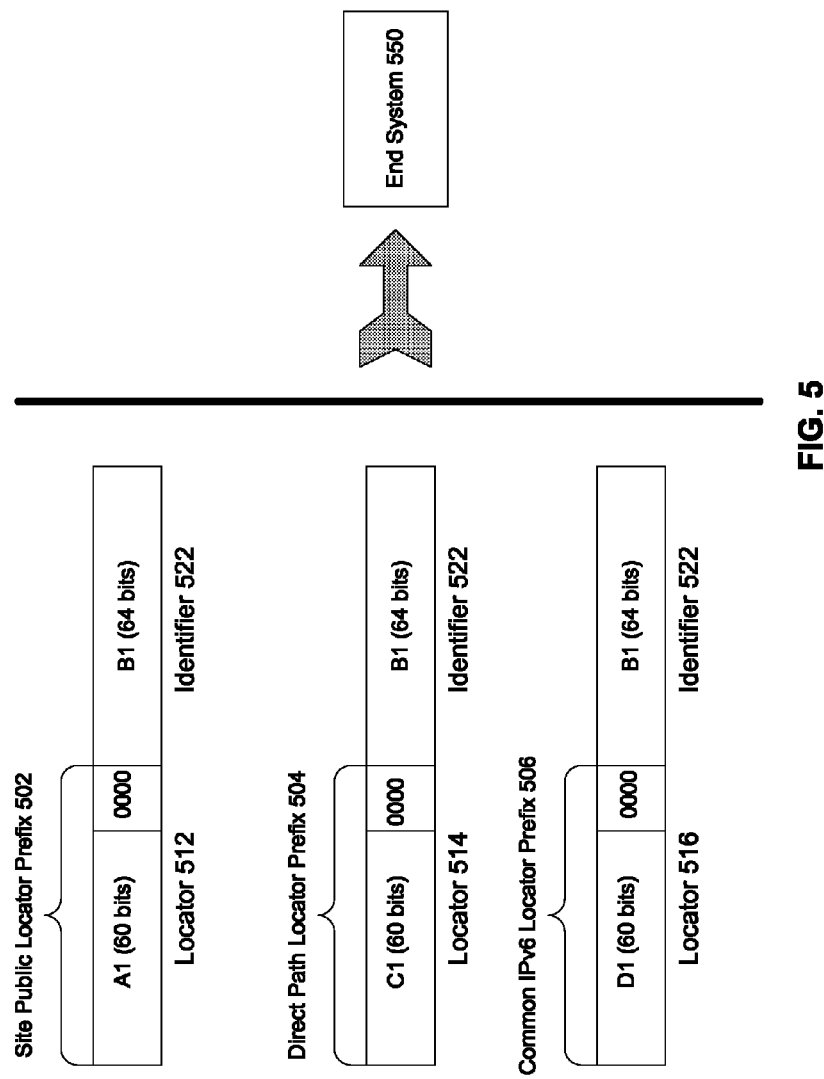
FIG. 5 is a block diagram illustrating multiple addresses assigned to an end system.

FIG. 5 is a block diagram illustrating multiple addresses assigned to an end system. As illustrated in FIGS. 3 and 4, a load balanced address can be shared among multiple end systems. The reverse is also true, and an end system may be assigned with multiple addresses, i.e., an end system may be reached through multiple IPv6 addresses. In FIG. 5, site public locator prefix 502, which is a part of locator 512, is assigned to end system 550, along with identifier 522. A site public locator prefix 502 can be a public locator prefix shared among the end systems at a particular physical or logical location, for example, within a data center. End system 550 may be assigned with a direct path locator prefix 504 as a part of locator 514. Along with identifier 522, direct path locator prefix 504 may be used to directly reach end system 550 without going through a load balancer. A direct path locator prefix may be associated with routes that an end system can be reached. Thus, when an end system can be reached directly through multiple gateways, the end system may have multiple direct path locator prefixes associated with the end system. Another type of IPv6 address that can be assigned to end system 550 is common IPv6 locator prefix 506. As discussed herein above, a common IPv6 locator prefix is shared among a set of load balanced targets. Thus, when end system 550 belongs to a load balanced target, a common IPv6 locator prefix will be assigned to the end system. An end system may belong to more than one load balanced target, thus more than one common IPv6 locator prefix, along with an associated identifier, may be assigned to an end system.

Dog Leg Routing and Avoidance

Figure 6A:
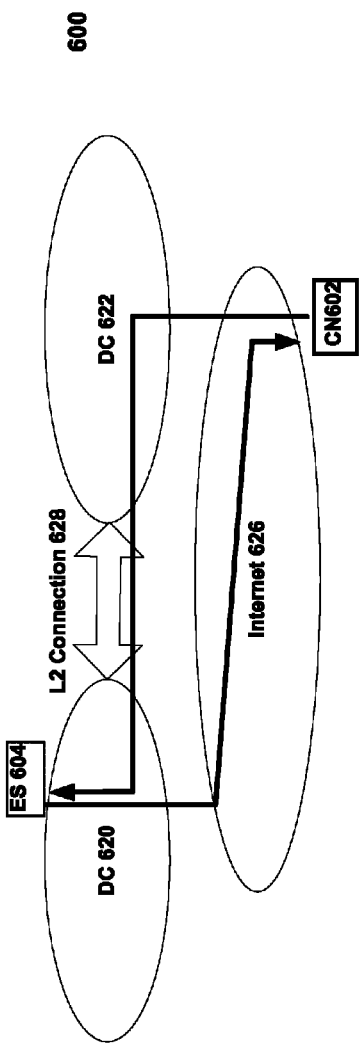
FIGS. 6A-6B are block diagrams illustrating routing through multiple data centers (DCs).
Figure 6B:
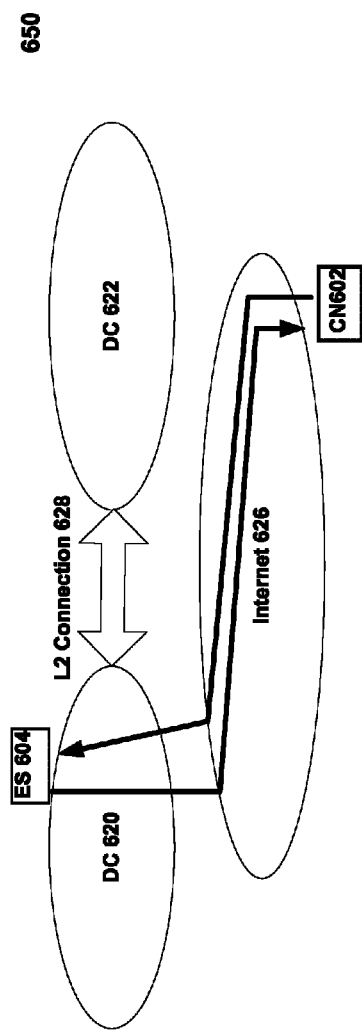

FIGS. 6A-6B are block diagrams illustrating routing through multiple data centers (DCs). FIG. 6A illustrates dog leg routing in a layer 2 connected network. Network 600 includes Internet 626 and data centers 620 and 622. The requesting node is correspondent node CN 602, and it requests from DNS an address to reach end system (ES) 604 in DC 620. The address returned by DNS is an anycast address which is to say it is advertised as reachable via either DC 620 or DC 622. For example, ES 604 may belong to a closed user group (CUG), which contains members within both DCs 620 and 622. CN 602 will send out an initial request to reach the anycast address. Because DC 622 is closer to CN 602, a request goes to DC 622 first. DC 622 knows ES 604 because ES 604 is within a subnet spanning DC 620 and DC 622, thus it forwards the request through the interconnect of DC 620 and DC 622, and finally reaches ES 604. ES 604 checks the requesting frame and sends back its returning frame through Internet 626 directly, without going through DC 622. Thus, data traffic at opposite directions takes on different paths in routing. This kind of routing is called dog leg routing or triangle routing. Dog leg routing sacrifices bandwidth efficiency thus it is desirable to avoid its occurrence.

FIG. 6B illustrates one embodiment of routing using ILNP to avoid dog leg routing for a pool of end systems reachable via a plurality of data center's attachment to the internet. Network 650 in FIG. 6B is similar to network 600 in FIG. 6A, but end systems in network 650 are ILNP enabled, thus ES 604 can be directed to reach by a direct path locator prefix and a common identifier after initially establishing contact via an anycast load balanced address. The requesting CN 602 will reach a LB in DC 622 initially and will be directed by the procedures outlined herein below in discussion associated with FIG. 7 to reach ES 604 through Internet 626 and DC 620 directly without going through DC 622 first-inter DC transit for access is eliminated. Thus, the data traffic between ES 604 and CN 602 goes through the same path in network 650, and bandwidth is not wasted. Note the avoidance of dog leg routing continues following a mobility event. For example, when ES 604 moves to DC 622, its direct path locator will be updated while preserving its common identifier. CN 602 will be able to reach ES 604 without searching for it at its old location in DC 620 first.

Embodiments of Frame Based ILNP Load Balancing and Routing

Referring back to FIG. 1, task boxes 1-5 illustrates the order in which operations are performed for a frame based ILNP load balancing and routing according to one embodiment. The process starts at requesting CN 102. At task box 1, CN 102 sends out a DNS query to resolve a request at DNS 104. DNS 104 examines the request, and DNS 104 returns a load balanced address back to CN 102. At task box 2, CN 102 sends out a request frame to LB 150, and the request frame contains a layer 3 packet. The layer 3 packet has IPv6 addresses specified. The source address is associated with CN 102, and the destination address is associated with the load balanced addressed that CN 102 has acquired from DNS 104. In one embodiment, when CN 102 is ILNP capable, a nonce option is indicated. The nonce option may be indicated in an IPv6 destination option of the IPv6 header in one embodiment. LB 150 directs the request frame to a specified end system from a set of target end systems that share the load balanced address indicated in the destination address of the requesting frame from CN 102. Note all the end systems within the set of target end systems share the same load balanced address, but each end system has a unique MAC address. One embodiment of a set of target end systems sharing a load balanced address is illustrated in FIG. 4 and has been discussed herein above. In this example, ES 180 is the specified end system selected by LB 150. LB 150 then directs the request frame to ES 180 via the selection of destination MAC address used for the frame. At task box 3, ES 180 receives the requesting frame, and it generates a nonce when the incoming frame indicates CN being ILNP capable. ES 180 sends back a reply message to LB 150. LB 150 receives the reply message and extracts the nonce from ES 180. At task box 4, LB 150 sends out an Internet Control Message Protocol (ICMP) locator change message to indicate a direct path locator prefix for ES 180. The direct path locator prefix is an IPv6 locator that indicates the location of ES 180 so that an end system may find a route to ES 180 directly without going through LB 150. An example is direct path locator prefix 504 illustrated in FIG. 5. Finally at task box 5, CN 102 switches to use the received direct path prefix of ES 180 as the locator portion of the destination address for its outgoing packet embedded in a frame and traffic between CN 102 and ES 180 will be transmitted directly between each other without going through LB 150.

In one embodiment, instead of LB 150 sending out an ICMP locator change message to indicate a direct path locator prefix for ES 180, ES 180, as the specific end system, sends out the ICMP locator change message to CN 102, the requesting CN, indicating the direct path locator prefix for ES 180. The ICMP locator change message is sent out upon the nonce of the forwarded request frame indicating CN 102 being ILNP capable and the request frame being addressed to the load balanced address. The direct path locator prefix is an IPv6 locator which corresponds to a routable location of ES 180, the specific end system.

In one embodiment, CN 102 is not ILNP capable. In that case, there is no nonce option indication at the requesting frame at task box 1. LB 150 needs to continue forwarding frames from ES 180 to CN 102, thus ES 180 cannot take advantage of knowing the direct path locator prefix.

Note since LB 150 is the one forwarding incoming frame to various end systems, LB 150 needs to keep up-to-date information about end systems. Inactive end systems need to be removed from a set of target end systems that the inactive end systems belong, and newly activated end systems (for example, a virtual switch comes online at a data center) need to be added to a set of target end systems. LB 150 needs to be synchronized with DNS 104. Also note that operations discussed herein above are carried on LB 150, which balances traffic between DC 180 and DC 182. Yet LB 152 may also balance traffic between the two data centers, when both LB 150 and LB 152 are in operations of load balancing and routing, they need to synchronize with each other and coordinate with load balancing and routing.

Figure 7:
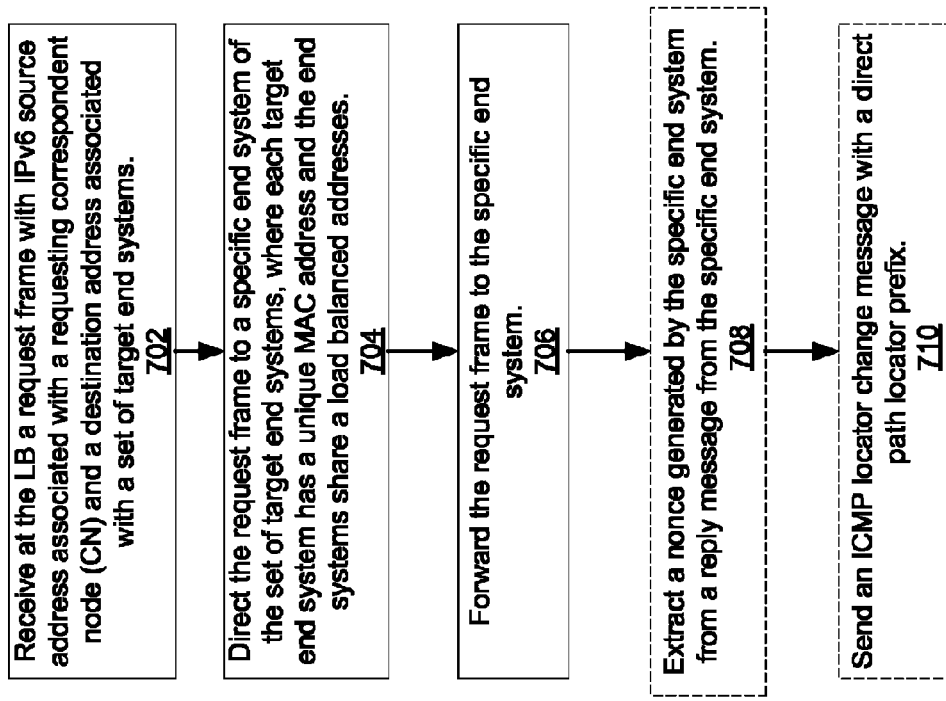
FIG. 7 is a flow diagram illustrating one embodiment of frame based ILNP routing at a load balancer (LB).

FIG. 7 is a block diagram illustrating one embodiment of frame based ILNP routing in a data network. The embodiment may be implemented on a LB. The process starts at block 702 when the LB receives a request frame with IPv6 source address specified and the source address associated with a requesting CN. If the requesting CN is ILNP capable, a nonce option is enabled to indicate the capability and the LB extracts this value and associates it with the flow. The destination address is associated with a load balanced address. As illustrated in FIG. 1, the load balanced address associated with a set of target end systems is obtained from a DNS associated with the network in one embodiment. Then at block 704, the request frame is directed to a specific end system from the set of target end systems that share the load balanced address, which is a single IPv6 address containing a common IPv6 locator prefix and a common ILNP identifier. However, each end system in the set of target end systems has a unique MAC address. The selection of the specific end system from the set of target end systems may be based on a number of criteria. For example, the criteria may be to reduce end system overload, optimize network resource utilization, increase network throughput, and/or reduce communication response time. After the specific end system is selected from the set of target end systems, the request frame is forwarded to the specific end system at block 706. Then optionally when the LB acts as a proxy, at block 708, a reply from the specific end system is received, and the nonce is extracted when a nonce is indicated. The method ends at block 710, when an ICMP locator change message is sent to the requesting CN. The ICMP locator change message includes a direct path locator prefix so that the requesting CN may direct future communication to the specific end system directly by putting the direct path locator prefix in the destination address of the IPv6 address in the future communication.

In one embodiment, after the specific end system receives the forwarded request frame, the specific end system sends out the ICMP locator change message to the requesting CN when the nonce of the forwarded request frame indicates the requesting CN being ILNP capable and the request frame is addressed to the load balanced address. The ICMP locator change message indicates a direct path locator prefix for the specific end system so that the requesting CN may direct future communication to the specific end system directly by putting the direct path locator prefix in the destination address of the IPv6 address in the future communication. Note for frame based ILNP routing and load balancing to work, an end system needs to have a site public locator prefix which is associated with the site the end system resides, so that the end system knows its location thus during routing, dog leg routing can be avoided—instead of knowing only the end system belongs to a subnet somewhere in a layer 2 network, the end system knows which data center it resides thus efficient routing can be achieved. The end system also needs to have a direct path locator prefix, so that the end system may be reach directly without going through a load balancer.

It is possible for a second message in the same flow to transit the LB as the ICMP locator change request was not successfully transmitted to the CN. In one embodiment, the LB needs to have retained sufficient information to direct subsequent messages to the same member of the load balanced set, and re-issue the ICMP locator change message. It retains the same state such that subsequent messages are consistently directed to the same member of load balanced set for flows originating with non-ILNP capable CNs as well.

Figure 8:
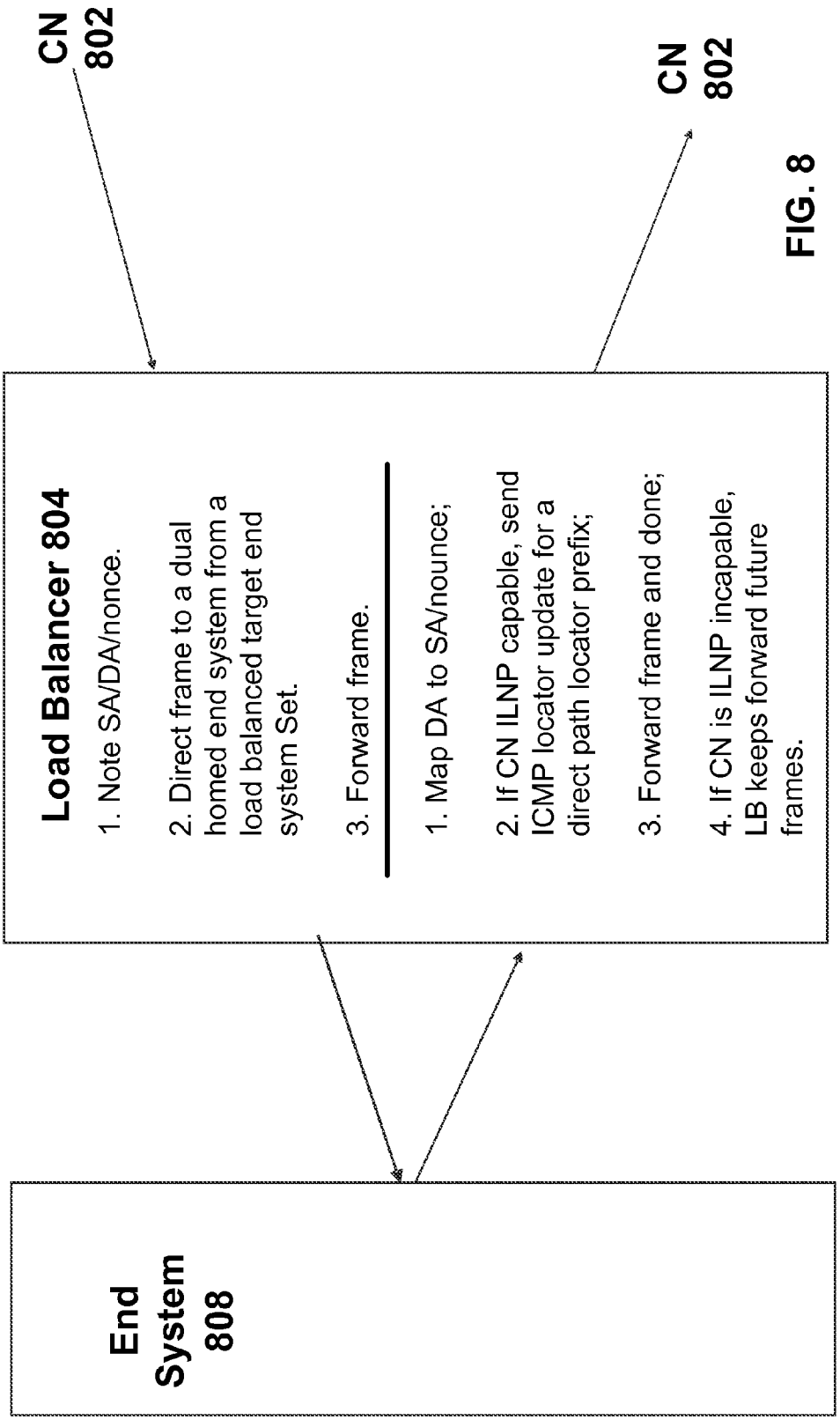
FIG. 8 is a block diagram illustrating one embodiment of frame based ILNP routing in a data network.

FIG. 8 is a block diagram illustrating one embodiment of frame based ILNP routing in a data network. The requesting correspondent node is CN 802, and it sends a request frame with a load balanced address associated with a set of target end systems specified as its destination address and the request frame is sent to load balancer (LB) 804. LB 804 notes the source and destination addresses of the embedded IPv6 packet. LB 804 also notes whether nonce option is enabled, where enablement indicates the requesting CN is ILNP enabled. LB 804 then directs the frame to an end system, end system (ES) 808, selected from the set of target end systems. ES 808 receives the forwarded frame, and it replies back to LB 804 with a message including a nonce when CN 802 is ILNP capable. The message indicates a direct path locator prefix indicating a direct path that CN 802 may use to route its future frames. LB 804 then sends an ICMP locator update message indicating the specified direct path locator prefix to CN 802. LB 804 completes its involvement in the routing when CN 802 is ILNP capable. However, when CN 802 is not ILNP capable, LB 804 continues forwarding future frames between ES 808 to CN 802, and no routing efficiency is achieved.

Embodiments of Packet Based ILNP Load Balancing and Routing

Figure 9:
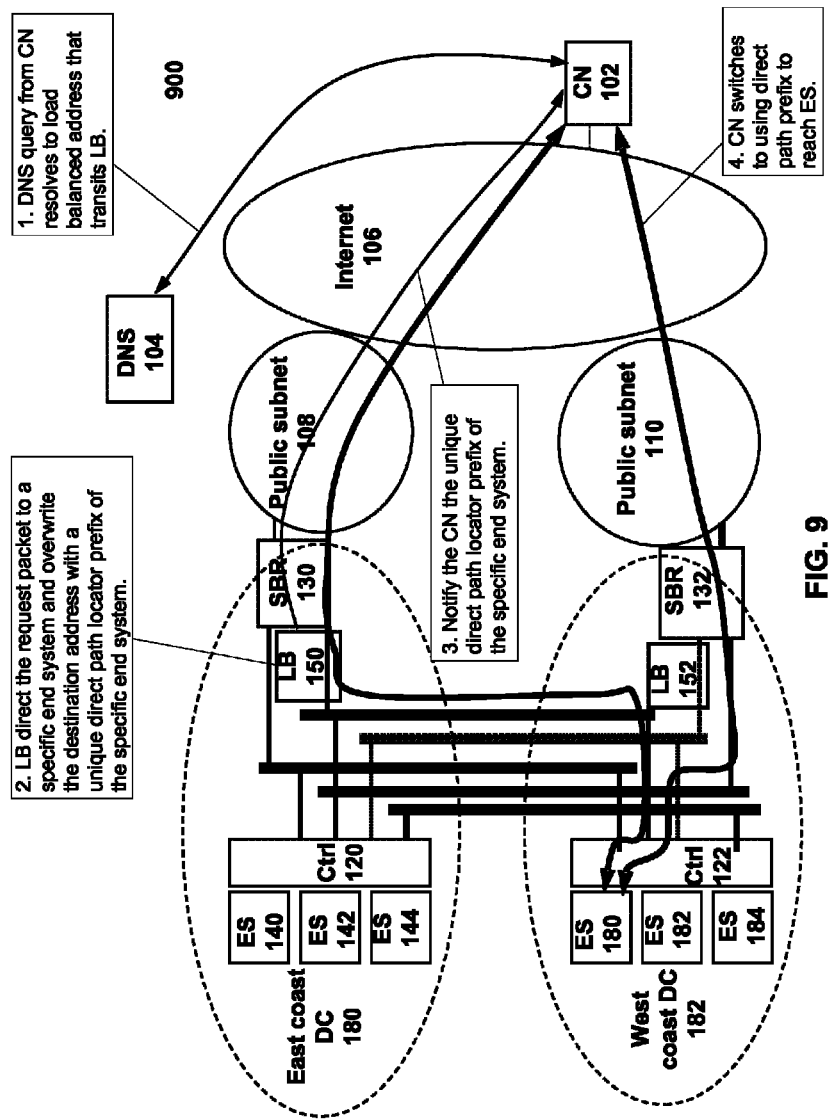
FIG. 9 is a block diagram illustrating one embodiment of a network configuration and operation of packet based ILNP routing.

FIG. 9 is a block diagram illustrating one embodiment of a network configuration and operation of packet based ILNP routing. Network 900 in FIG. 9 is similar to network 100 in FIG. 1, and the same or similar references indicate elements or components having the same or similar functionalities. In network 900, task boxes 1-4 illustrate the order in which operations are performed for a packet based ILNP load balancing and routing according to one embodiment. The process starts at requesting CN 102. At task box 1, CN 102 sends out a DNS query to resolve a request at DNS 104. DNS 104 examines the request, and it returns a load balanced address back to CN 102. CN 102 sends out a request packet to LB 150. The request packet contains IPv6 source and destination addresses. The source address is associated with CN 102, the requesting correspondent node. The destination address is associated with a shared load balanced address, which corresponds to a set of target end systems. In one embodiment, when CN 102 is ILNP capable, nonce information is indicated in the packet. The nonce indication may be indicated in an IPv6 destination option of the IPv6 header in one embodiment. At task box 2, LB 150 directs the request packet to a specific end system from the set of target end systems associated with the destination address specified in the request packet. The end systems within the set of target end systems share a load balanced address, which is a single IPv6 address containing a common IPv6 locator prefix and a common ILNP identifier. At the same time, each end system has a unique direct path locator prefix. One embodiment of a set of target end system sharing a load balanced address is illustrated in FIG. 3 discussed herein above. In this example, LB 150 selects ES 180 as the specific end system to direct the request packet to. LB 150 may make the selection based on one or more criteria such as to reduce end system overload, optimize network resource utilization, increase network throughput, and/or reduce communication response time. Once the selection is made, LB 150 overwrites the common IPv6 locator prefix with the destination address of the request packet, the common IPv6 locator prefix being shared among the set of target end systems, with the unique direct path locator prefix of the specific end system, ES 180. When the incoming packet indicates that CN 102 is not ILNP capable, LB 150 converts the request packet using an application layer gateway (ALG) so that ES 180 may be able to process the packet properly. Applying ALG to a packet is within the knowledge of one skilled in the art. The request packet then is sent to ES 180. ES 180 receives the request packet. After receiving the packet, ES 180 sends back LB 150 a nonce for its communication.

At task box 3, LB 150 notifies CN 102 the unique direct path locator prefix of ES 180 once it gets the nonce of end system ES 180. At task box 4, after receives the unique direct path locator prefix, CN 102 then communicates with ES 180 directly without going through LB 150 for load balancing anymore for future communication between CN 102 and ES 180.

Figure 10:
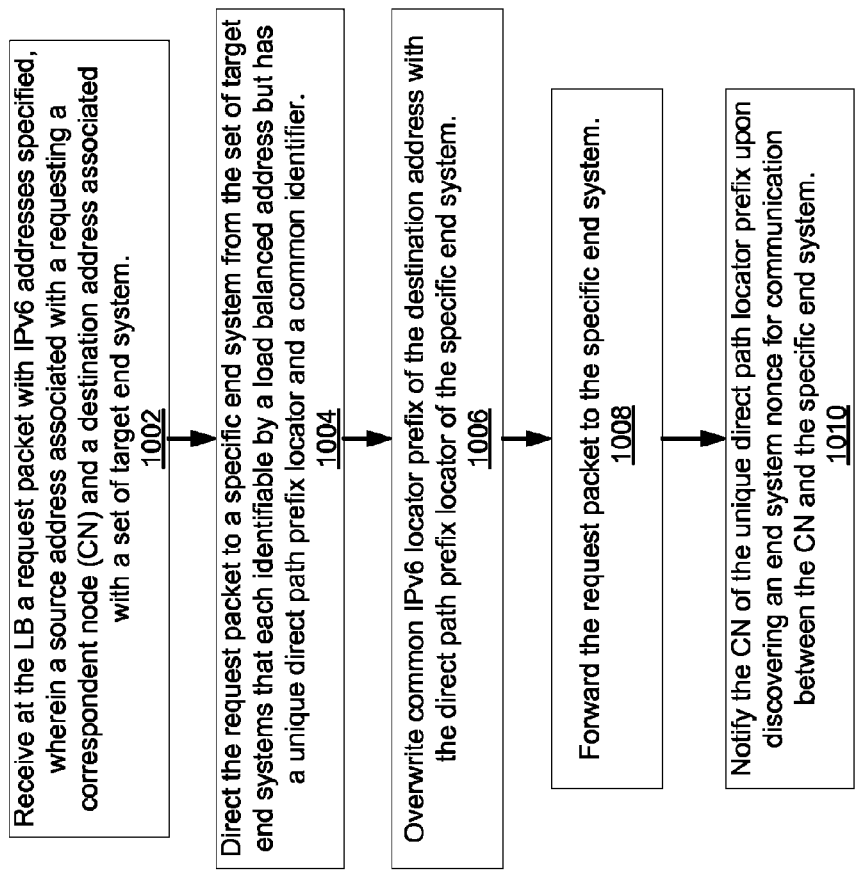
FIG. 10 is a flow diagram illustrating one embodiment of packet based ILNP routing at a load balancer (LB).

FIG. 10 is a block diagram illustrating one embodiment of packet based ILNP routing in a data network. The embodiment may be implemented on a LB. The process starts at block 1002 when the LB receives a request packet with IPv6 source address specified and the source address associated with a requesting CN. When the requesting CN is ILNP capable, a nonce option is enabled to indicate the capability. The destination address is associated with a set of target end systems that shared a load balanced address. As illustrated in FIG. 9, the destination address associated with a set of target end systems is obtained from a DNS associated with the network in one embodiment. At block 1004, a specific end system is selected from the set of target end systems based on criteria such as to reduce end system overload, optimize network resource utilization, increase network throughput, and/or reduce communication response time. The specific end system has a unique direct path prefix locator but the identifier is common to the identifier of the other target end systems within the set of target end systems. At block 1006, the common IPv6 locator prefix of the destination address is overwritten with a unique direct path locator prefix of the specific end system. The request packet with the new unique direct path locator prefix is then sent to the specific end system at block 1008. Then the CN is notified of the direct path locator prefix upon discovering an end system nonce for communication between the CN and the specific end system at block 1010. The end system nonce for communication is sent by the specific end system after the end system receives the request packet.

Figure 11:
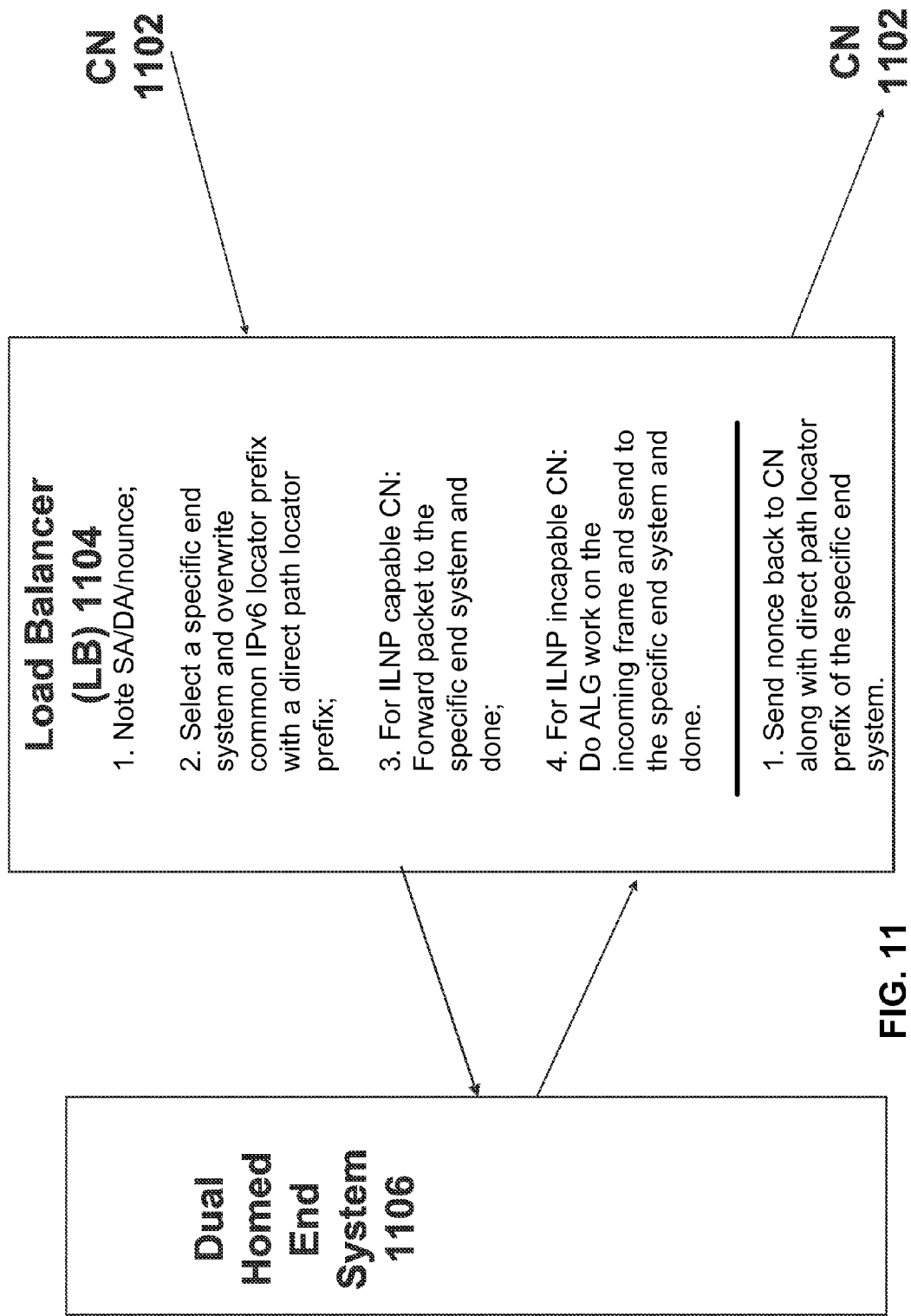
FIG. 11 is a block diagram illustrating one embodiment of packet based ILNP routing in a data network.

FIG. 11 is a block diagram illustrating one embodiment of packet based ILNP routing in a data network. CN 1102 is the requesting correspondent node that sends out a request packet to load balancer (LB) 1104. The request packet includes a source IPv6 address associated with CN 1102 and a destination IPv6 address being a load balanced address. The load balanced address is associated with a set of target end systems, and each target end system has a unique direct path locator prefix but each has a common ILNP identifier. LB 1104 selects a specific end system from the set of target end systems. Then LB 1104 overwrites the locator portion of the ILNP destination address with a direct path locator prefix that uniquely identifies the specific end system, and then forwards the packet to dual-homed end system (ES) 1106. When CN 1002 is not ILNP capable, LB 1104 applies ALG to the request packet and then sends the revised packet to ES 1106. Dual-homed ES 1106 receives the forwarded packet, and it replies back to LB 1104 with a packet including a nonce when CN 1102 is ILNP capable. LB 1104 then notifies CN 1102 the unique direct path locator prefix of ES 1106 with the nonce indication so that CN 1002 and ES 1106 can communicate directly for all future communications. Note that with packet based ILNP routing, an end system needs to be reach through at least one IPv6 address containing a direct path locator prefix and an identifier. In packet based ILNP routing, a dual-homed end system may have multiple direct path locator prefixes so that the dual-home end system may be reach directly over multiple direct paths without through a translation of site public locator prefix to a direct path locator prefix.

Figure 12:
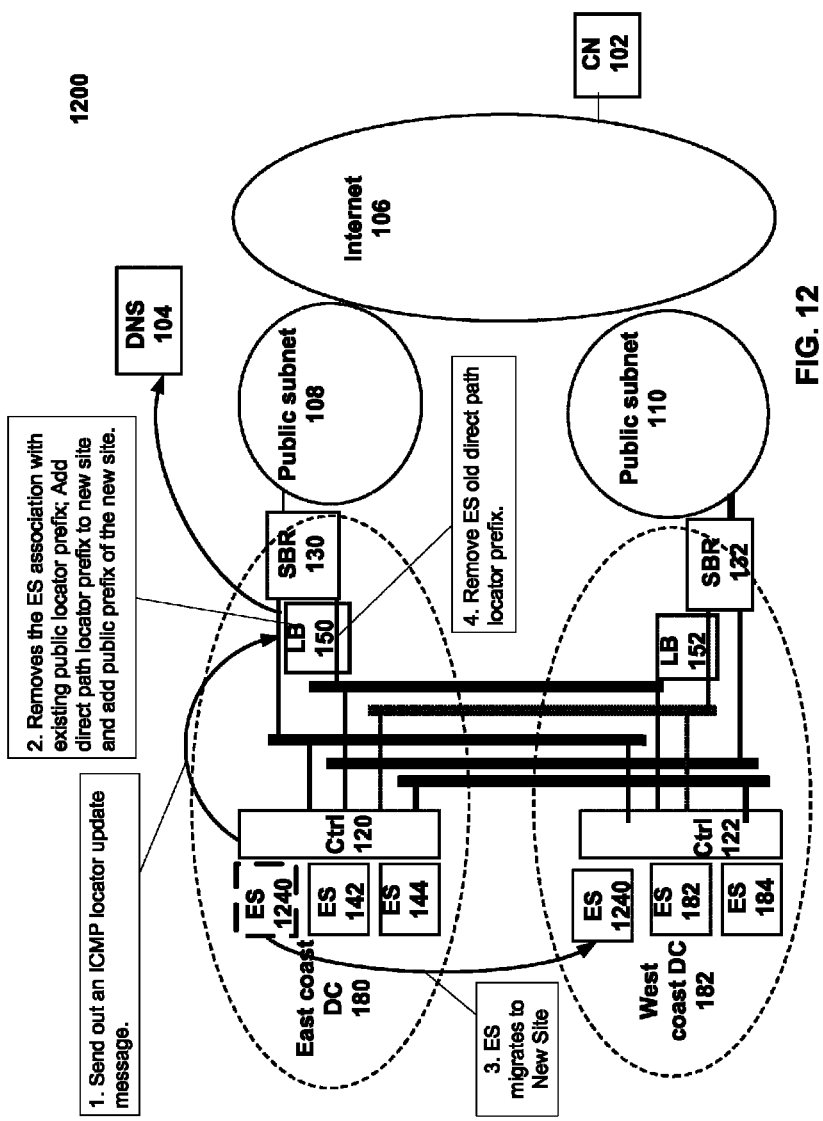
FIG. 12 is a block diagram illustrating one embodiment of a network configuration and operation of end system migration.

Embodiments of End System Migration for Packet Based ILNP Routing and Load Balancing FIG. 12 is a block diagram illustrating one embodiment of a network configuration and operation of end system migration. Network 1200 in FIG. 12 is similar to network 100 in FIG. 1, and the same or similar references indicate elements or components having the same or similar functionalities. In network 1200, packet based ILNP routing and load balancing is enabled. Task boxes 1-5 illustrate the order in which operations are performed for an end system migration in one embodiment. In network 1200, end system (ES) 1240 is a mobile end system. ES 1240 initially resides in an east coast data center DC 180 and it will migrate to DC 182 at the west coast. At task box 1, ES 1240 sends out an ICMP locator update message. The ICMP locator update message includes a new ILNP direct path locator prefix associated to the new location that ES 1240 intended to move to (i.e., DC 182). The ICMP locator update message is sent to currently active correspondent nodes in network 1200. Load Balancer (LB) 150 is one of the current active correspondent nodes and LB 150 is ILNP capable. At task box 2, LB 150 removes ES 1240 association with its existing public locator prefix and adds a direct path locator prefix associated with the new site (DC 182). In addition, LB 150 adds a public locator prefix of the new site to be associated with ES 1240. At task box 3, ES 1240 moves from DC 180 to DC 182. Then at task box 4, LB 150 removes the old direct path locator prefix associated with ES 1240. Note, in this embodiment, ES 1240 is dual-homed with direct path locator prefixes for both DC 180 and DC 182 after task box 2 and prior to task box 4. In one embodiment, when a mobile end system is dual-homed on multiple direct paths, the mobile end system may send ICMP locator updates to any CNs directed to it through the old direct path locator prefix by a LB during the transition from the old location to the new location.

Figure 13:
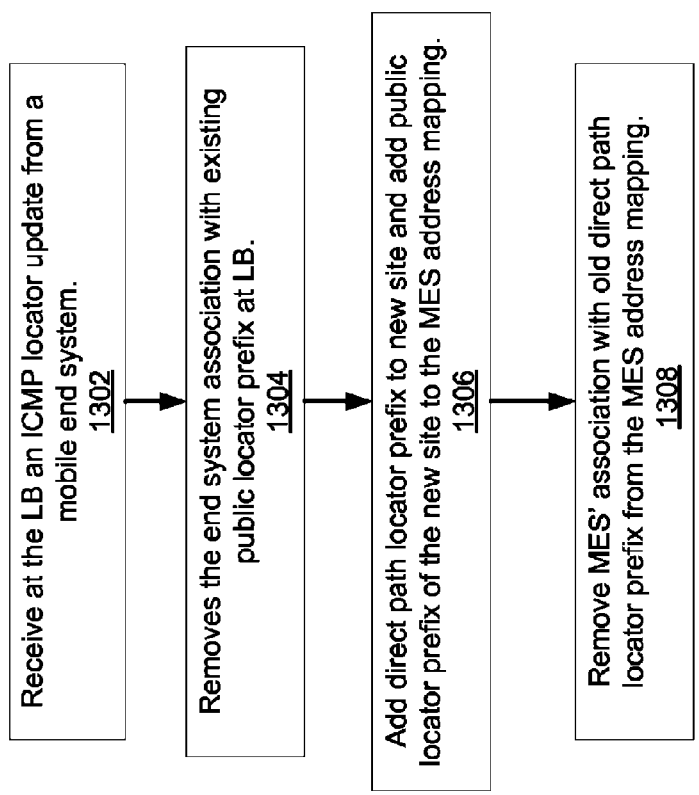
FIG. 13 is a flow diagram illustrating one embodiment of end system migration.

FIG. 13 is a flow diagram illustrating one embodiment of end system migration. The method may be implemented on a load balancer (LB). The method starts at block 1302 when a LB receives an ICMP locator update message from a mobile end system (MES). The ICMP locator update message includes a new ILNP direct path locator prefix associated to the new location that the MES intends to move to. Note the MES may send the ICMP locator update message to active CNs in the network other than the LB. After the LB receives the ICMP locator update message, it removes the MES's association with an existing public locator prefix at block 1304. In one embodiment, the public locator prefix is associated with the current site public locator prefix where the MES resides prior to migration. Then at block 1306, LB adds a direct path locator prefix associated with the new site where the MES migrates to. The LB also adds a public locator prefix of the new site to the MES address mapping. Then the LB removes the MES' association with old direct path locator prefix from the MES address mapping at block 1308.

Embodiments of End System Migration for Frame Based ILNP Routing and Load Balancing A mobile end system (MES) may also migrate to a new location in a network enabled frame based ILNP routing and load balancing. In one embodiment, a MES is homed both on an old direct path locator prefix and a new direct path locator prefix after migration to a new location. The MES sends out an ICMP locator update messages to active CNs once it has migrated to a new location. The ICMP locator update message includes a new ILNP direct path locator prefix associated to the new location that a management system (e.g., an element management system, EMS) has moved the MES to. The ICMP locator update message is sent to currently active correspondent nodes in the network. A LB of the network is one of the current active correspondent nodes and it is ILNP capable. The LB then replaces the direct path locator prefix with the new ILNP direct path locator prefix. The load balanced IPv6 address does not change.

Embodiments of an Load Balancer

Figure 14:
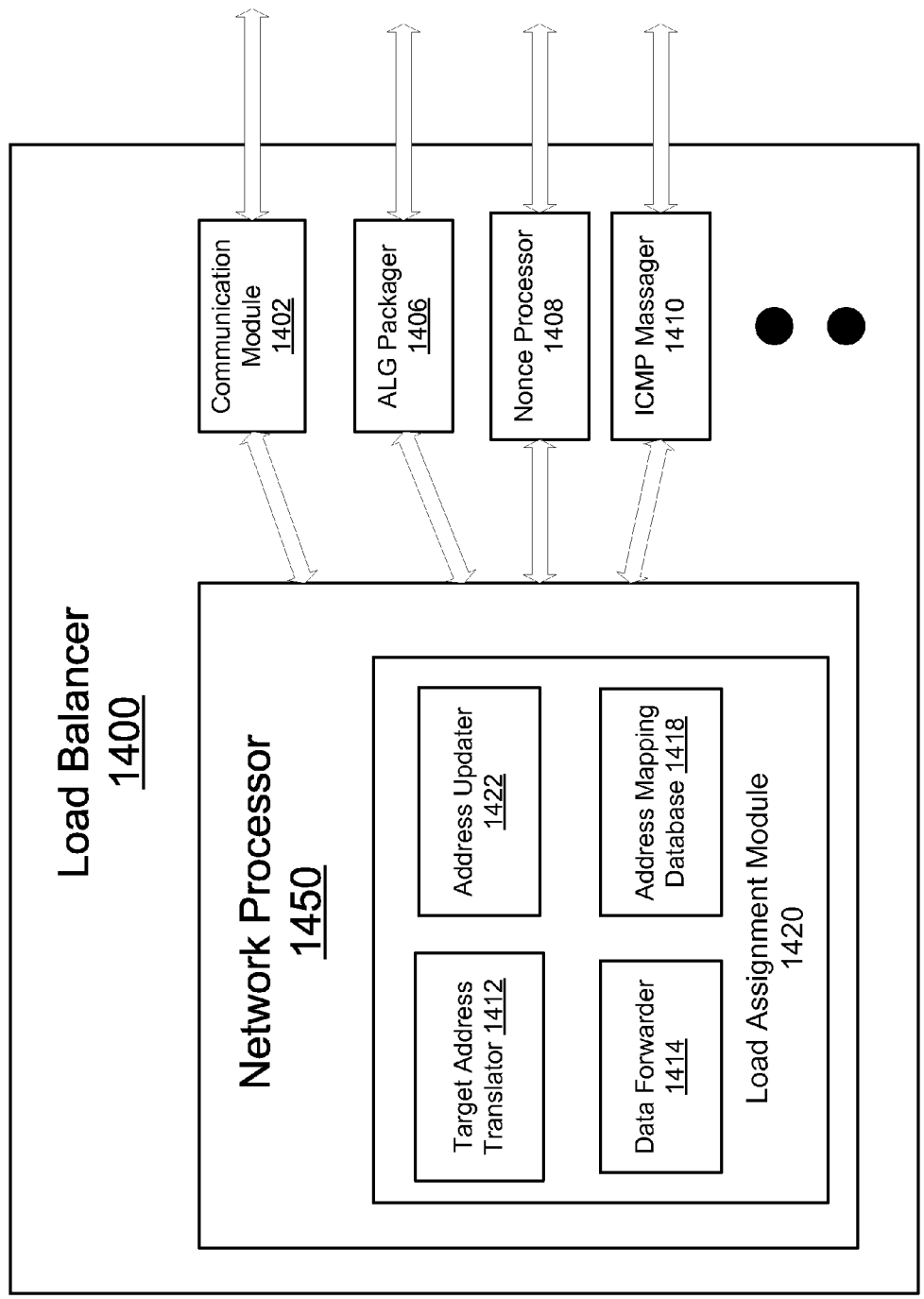
FIG. 14 is a block diagram illustrating one embodiment of a network element serving as a load balancer (LB).

FIG. 14 is a block diagram illustrating one embodiment of a network element serving as a load balancer (LB). In one embodiment, a network element includes a set of one or more line cards (e.g., communication module 1402), a set of one or more control cards (e.g., network processor 1450), and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. Note that embodiments of this invention apply where the control plane and data plane are in separate network elements.

LB 1400 may contain communication module 1402 that can be configured to communicate with correspondent nodes, end system, SBR, other LBs and other network elements in a network. For example, communication module 1402 may receive request frame or packet from a requesting CN and reply messages from end systems. In one embodiment, LB 1400 may contain an application layer gate (ALG) packager 1406, which can be configured to convert a packet before sending it out to an end system when the packet is not ILNP compatible. In addition, LB 1400 may contain a nonce processor 1408 that process nonce information. Nonce process 1408 can be configured to detect nonce information of an incoming frame and packet, and it can also be configured to insert and extract nonce information. LB 1400 may contain an ICMP messager 1410 that can be configured to process incoming ICMP messages from other network elements and it also can be configured to generate ICMP messages to send to other network elements. For example, ICMP messager can be configured to send out ICMP locator change message to a requesting CN and indicate a direct path locator prefix of an end system so that the requesting CN can communicate with the end system directly. As will be discussed herein below, along with network processor 1450, these cards coupled together to complete routing and load balancing upon request.

Network processor 1450 is a physical processor that contains a load assignment module 1420. Load assignment module 1420 contains a target address translator 1412. Target address translator 1412 can be configured to direct a request frame/packet to a specific end system from a set of target end systems that share a load balanced address. In a frame based model, the load balanced address are shared among a set of target end systems that each has a unique MAC address but share a common IPv6 locator prefix. In a packet based model, the load balanced address are shared among a set of target end systems but each end system has a unique direct path locator prefix and each is reachable through a common IPv6 locator prefix and common ILNP identifier combination. Load assignment module 1420 may contains an address updater 1422 that can be configured to overwrite a common IPv6 locator prefix of a destination address of a packet with the unique direct path locator prefix of a specific end system. Load assignment module 1420 may also contain an address mapping database 1418 that can be configured to maintain the mapping of load balanced addresses with sets of target end systems. Address mapping database 1418 can be configured to be dynamically updated as LB 1400 conducts routing and load balancing. In addition, load assignment module 1420 may also include a data forwarder 1414 that is configured to forward incoming frame/packet to end systems. Note that the network processor 1450 can be general purpose or special purpose processors. The individual modules in network processor 1450 can contain their dedicated network process units (NPU) or they can share NPUs among multiple modules. For example, target address translator 1412 and data forwarder 1414 may share a same NPU. Also note that load assignment module 1420 may be outside of network processor 1450, and load assignment module 1420 can carry out its routing and load balancing function as long as it is communicatively coupled with network processor 1450.

In one embodiment, the modules and processors are configured to support frame based load balancing and routing. The process starts with communication module 1402 receives a request frame from a requesting correspondent node (CN). Communication module 1402 forwards the frame to nonce processor 1408 to determine whether or not nonce option is enabled. The frame is sent to load assignment module 1420 within network processor 1450. Target address translator 1412 selects a load balanced address associated with a set of target systems, after checking the address mapping database 1418, where the mapping between load balanced addresses and end systems are kept. The data forwarder 1414 then forwards the request frame out to an end system. Afterward, LB 1400 waits for a reply message back from the end system. When the end system sends back a reply message, nonce processor 1408 extract nonce and ICMP messager 1410 sends out an ICMP locator change message to the requesting CN, including a direct path locator prefix for the specific end system.

In another embodiment, the modules and processors are configured to support packet based load balancing and routing. The process starts with communication module 1402 receives a request packet from a requesting correspondent node (CN). Communication module 1402 forwards the frame to nonce processor 1408 to determine whether or not nonce option is enabled. The request packet is sent to load assignment module 1420 within network processor 1450. Target address translator 1412 selects a load balanced address associated with a set of target systems, after checking the address mapping database 1418, where the mapping between load balanced addresses and end systems are kept. The address updater 1422 then overwrites the common IPv6 locator prefix of the destination address with a unique direct path locator prefix associated with the specific end system. The request packet is then be processed by ALG packager 1406 when the requesting CN is not ILNP capable and the nonce option indicates so. The requesting packet then sent to the specific end system. Afterward, LB 1400 waits for a reply message back from the end system. When the end system sends back a reply message, nonce processor 1408 extract nonce, and communication module 1402 sends the requesting CN the unique direct path locator prefix of the specific end system.

In another embodiment the modules and processors are configured to support both frame based and packet based ILNP load balancing and routing, depending on network configuration. Also note that various modules can be implemented as a single unit or multiple units can combine two or more units within LB 1400, and these modules can be implemented in software, hardware or a combination thereof.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to provide load balancing and routing for a plurality of end systems in a network, wherein the network contains at least one load balancer (LB) that balances traffic load across the plurality of end systems, the method comprising:

receiving at the LB a request packet with Internet Protocol version 6 (IPv6) source and destination addresses specified, and wherein a source address is associated with a requesting correspondent node (CN) and a destination address is associated with a set of target end systems, and nonce information in the request packet indicates that the requesting CN is Identifier Locator Network Protocol (ILNP) capable;

directing the request packet to a specific end system from the set of target end systems, wherein the set of target end systems is identifiable by the requesting CN by a load balanced address, wherein each target end system has a unique direct path locator prefix and a common ILNP identifier, and wherein the load balanced address is a single IPv6 address containing a common IPv6 locator prefix and the common ILNP identifier shared among the set of target end systems;

overwriting the common IPv6 locator prefix of the destination address with the unique direct path locator prefix of the specific end system;

forwarding the request packet to the specific end system; and notifying the requesting CN of the unique direct path locator prefix of the specific end system upon discovering an end system nonce for communication between the requesting CN and the specific end system.

2. The method of claim 1, wherein the end system nonce for communication between the requesting CN and the specific end system is sent by the specific end system after receiving the forwarded request packet.

3. The method of claim 1, wherein the request packet is formed by the requesting CN after the requesting CN sends a query to a Domain Name System (DNS) associated with the network to obtain the destination address associated with the set of target end systems.

4. The method of claim 1, further comprising converting the request packet using an application layer gateway (ALG) packager before forwarding the request packet to the specific end system when the request packet indicate that the requesting CN is not ILNP compatible.

5. The method of claim 1, wherein an end system of the set of target end systems may be reached through a plurality of IPv6 address instances including: at least one IPv6 address containing a direct path locator prefix and the common ILNP identifier.

6. The method of claim 5, wherein each direct path locator prefix corresponds to a gateway of a data center (DC) that the end system of the set of target end systems resides.

7. The method of claim 1, wherein an inactive end system from the set of target end systems are removed from the set of target end systems supported by the LB.

8. The method of claim 1, wherein at least one of the plurality of end systems is a mobile end system, the mobile end system sending an ICMP locator update message to currently active CNs when migrating to a new location, wherein the ICMP locator update message includes a new ILNP direct path locator prefix indicating the new location.

9. The method of claim 8, wherein the LB is one of the currently active CNs that is ILNP capable for the end system.

10. The method of claim 8, further comprising: upon receiving the ICMP locator update message at the LB, replacing a direct path locator prefix for the mobile end system with the new ILNP direct path locator prefix.

11. A network element serving as a load balancer (LB) to provide load balancing and routing for a plurality of end systems in a network, the network element comprising:
a communication module configured to receive a request packet with Internet Protocol version 6 (IPv6) source and destination addresses specified, and wherein a source address is associated with a requesting correspondent node (CN) and a destination address is associated with a set of target end systems, and wherein nonce information in the request packet indicates that the requesting CN is Identifier Locator Network Protocol (ILNP) capable,
wherein the communication module further configured to notify the requesting CN of a unique direct path locator prefix of a specific end system upon discovering an end system nonce for communication between the requesting CN and the specific end system;
a nonce processor configured to extract a nonce generated by a specific end system from a reply message upon receiving the reply message from the specific end system; and
a network processor comprising a load assignment module, the load assignment module comprising:
a target address translator configured to direct the request packet to a specific end system from the set of target end systems, wherein the set of target end systems is identifiable by the requesting CN by a load balanced address, wherein each target end system has a unique direct path locator prefix and a common ILNP identifier, and wherein the load balanced address is a single IPv6 address containing a common IPv6 locator prefix and the common ILNP identifier shared among the set of target end systems;
an address updater configured to overwrite the common IPv6 locator prefix of the destination address with the unique direct path locator prefix of the specific end system; and
a data forwarder configured to forward the request packet to the specific end system.

12. The network element of claim 11, wherein the end system nonce for communication between the requesting CN and the specific end system is sent by the specific end system after receiving the forwarded request packet.

13. The network element of claim 11, wherein the request packet is formed by the requesting CN after the requesting CN sends a query to a Domain Name System (DNS) associated with the network to obtain the destination address associated with the set of target end systems.

14. The network element of claim 11, further comprising an application layer gateway (ALG) packager configured to convert the request packet before forwarding the request packet to the specific end system when the request packet is not ILNP compatible.

15. The network element of claim 11, wherein an end system of the set of target end systems may be reached through a plurality of IPv6 address instances including: at least one IPv6 address containing a direct path locator prefix and the common ILNP identifier.

16. The network element of claim 15, wherein each director path locator prefix corresponds to a gateway of a data center (DC) that the end system of the set of target end systems resides.

17. The network element of claim 11, wherein the address updater further configured to remove an inactive end system from the set of target end systems.

18. The network element of claim 11, wherein at least one of the plurality of end systems is a mobile end system, the mobile end system sending an ICMP locator update message to currently active CNs when migrating to a new location, wherein the ICMP locator update message includes a new ILNP direct path locator prefix indicating the new location.

19. The network element of claim 18, wherein the LB is one of the currently active CNs that is ILNP capable for the mobile end system.

20. The network element of claim 18, wherein the address updater further configured to replace a direct path locator prefix for the mobile end system with the new ILNP direct path locator prefix upon receiving the ICMP locator update message.

21. A method to provide load balancing and routing for a plurality of virtual machines (VMs) in a network, wherein the network contains at least one load balancer (LB) that balances traffic load across the plurality of VMs, the method comprising:
receiving at the LB a request packet with Internet Protocol version 6 (IPv6) source and destination addresses specified, and wherein a source address is associated with a requesting correspondent node (CN) and a destination address is associated with a set of target VMs, and nonce information in the request packet indicates that the requesting CN is Identifier Locator Network Protocol (ILNP) capable;
directing the request packet to a specific VM from the set of target VMs, wherein the set of target VMs is identified by a load balanced address, wherein each target VM has a unique direct path locator prefix and a common ILNP identifier, wherein the load balanced address is a single IPv6 address containing a common IPv6 locator prefix and the common ILNP identifier shared among the set of target VMs;

overwriting the common IPv6 locator prefix of the destination address with the unique direct path locator prefix of the specific VM;

forwarding the request packet to the specific VM; and notifying the CN of the unique direct path locator prefix of the specific VM upon discovering an end system nonce for communication between the CN and the specific VM.

22. A load balancer (LB) to provide load balancing and routing to a tenant for a plurality of VMs in a network, the LB comprising:

a communication module configured to receive a request packet with Internet Protocol version 6 (IPv6) source and destination addresses specified, and wherein a source address is associated with a requesting correspondent node (CN) and a destination address is associated with a set of target VMs, and wherein nonce information in the request packet indicates that the CN is Identifier Locator Network Protocol (ILNP) capable, wherein the communication module further configured to notify the CN of the unique direct path locator prefix of a specific end system upon discovering an end system nonce for communication between the CN and the specific end system;

a nonce processor configured to extract an nonce generated by the specific VM from a reply message upon receiving the reply message from the specific VM; and a network processor comprising a load assignment module, the load assignment module comprising:

a target address translator configured to direct the request packet to a specific VM from the set of target VMs, wherein the set of target VM is identifiable by the requesting CN by a load balanced address, wherein each target VM has a unique direct path locator prefix and a common ILNP identifier, and wherein the load balanced address is a single IPv6 address containing a common IPv6 locator prefix and the common ILNP identifier shared among the set of target VMs;

an address updater configured to overwrite common IPv6 locator prefix of the destination address with the unique direct path locator prefix of the specific VM; and a data forwarder configured to forward the request packet to the specific VM.

* * * * *

UNITED STATES PATENT AND TRADEMARK OFFICE
CERTIFICATE OF CORRECTION

PATENT NO. : 8,879,394 B2  
APPLICATION NO. : 13/657727  
DATED : November 4, 2014  
INVENTOR(S) : Allan et al.

Page 1 of 2

It is certified that error appears in the above-identified patent and that said Letters Patent is hereby corrected as shown below:

On the Title Page, item (71), delete "Ericsson," and insert -- Ericsson (publ), --, therefor.

In the drawings

Fig. 1, Sheet 1 of 14, delete " " and insert -- --, therefor.

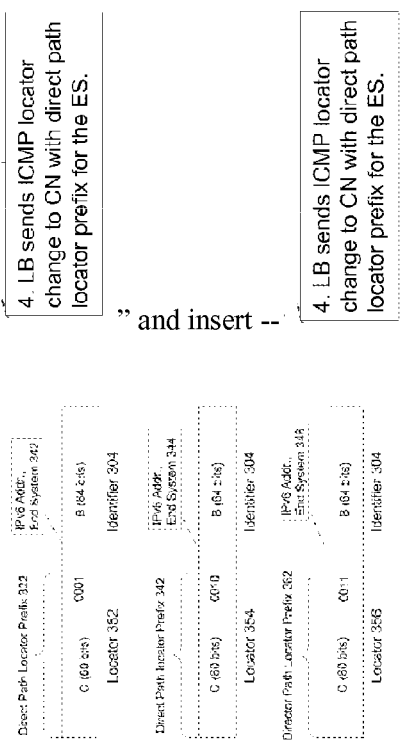

Fig. 1, Sheet 3 of 14, delete " " and

Signed and Sealed this  
Nineteenth Day of January, 2016

Michelle K. Lee  
*Director of the United States Patent and Trademark Office*

CERTIFICATE OF CORRECTION (continued)
U.S. Pat. No. 8,879,394 B2 insert -- 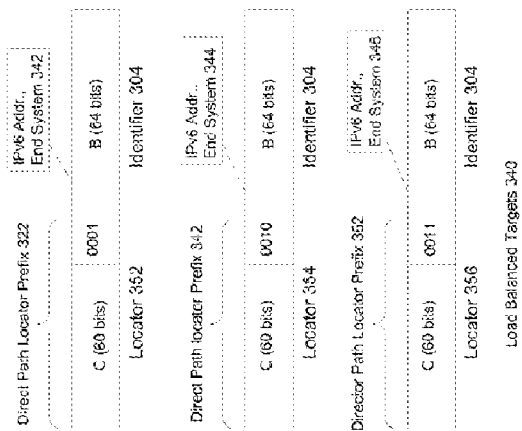 --, therefor.

Fig. 14, Sheet 14 of 14, in Box "1410", in Line 1, delete "Massager" and insert -- Messenger --, therefor.

In the specification

Column 4, Line 57, delete "(RSVP))" and insert -- (RSVP) --, therefor.

Column 14, Line 28, delete "an Load" and insert -- a Load --, therefor.

Column 14, Line 58, delete "messager" and insert -- messenger --, therefor.

Column 14, Line 61, delete "messager" and insert -- messenger --, therefor.